US012326031B2

(12) United States Patent
Gorenzweig et al.

(10) Patent No.: US 12,326,031 B2
(45) Date of Patent: Jun. 10, 2025

(54) ACTUATING DEVICE WITH COVER ELEMENT, VEHICLE, AND METHOD

(71) Applicant: Huf Hülsbeck & Fürst GmbH & Co. KG, Velbert (DE)

(72) Inventors: Igor Alexander Gorenzweig, Wuppertal (DE); Steffen Leib, Ratingen (DE); Sven Hild, Hagen (DE); Yevgen Dementyev, Wuppertal (DE); Andreas Gornik, Gevelsberg (DE)

(73) Assignee: Huf Hülsbeck & Fürst GmbH & Co. KG, Velbert (DE)

( * ) Notice: Subject to any disclaimer, the term of this patent is extended or adjusted under 35 U.S.C. 154(b) by 131 days.

(21) Appl. No.: 17/794,531

(22) PCT Filed: Feb. 1, 2021

(86) PCT No.: PCT/EP2021/052274
§ 371 (c)(1),
(2) Date: Jul. 21, 2022

(87) PCT Pub. No.: WO2021/156186
PCT Pub. Date: Aug. 12, 2021

(65) Prior Publication Data

US 2023/0144235 A1 May 11, 2023

(30) Foreign Application Priority Data

Feb. 5, 2020 (DE) ..................... 10 2020 102 887.3

(51) Int. Cl.
*E05F 15/75* (2015.01)
*E05B 81/64* (2014.01)
*E05F 15/73* (2015.01)

(52) U.S. Cl.
CPC .............. *E05F 15/75* (2015.01); *E05B 81/64* (2013.01); *E05F 2015/765* (2015.01);
(Continued)

(58) Field of Classification Search
CPC .......... E05B 81/64; E05B 85/16; E05B 77/34; E05B 79/06; E05F 2015/765; E05F 15/73; B60R 25/1001
See application file for complete search history.

(56) References Cited

U.S. PATENT DOCUMENTS 10,821,937 B1 * 11/2020 Salter .................... B60R 25/245
2017/0194960 A1 * 7/2017 Bextermoeller ........ E05B 81/77
(Continued)

FOREIGN PATENT DOCUMENTS

DE 102015116153 A1 3/2017
EP 0582969 A1 2/1994
(Continued)

OTHER PUBLICATIONS

Office Action for European Application No. 21702993.3 mailed on Jul. 7, 2023, with its English Translation, 7 pages.

*Primary Examiner* — Vernal U Brown
(74) *Attorney, Agent, or Firm* — Christian S. Hans; Peter W. Schroen; Bret E. Field

(57) ABSTRACT

An actuating device (10) for triggering a function of a vehicle (1) by a user is provided, having a cover element (11) for a vehicle part (2) of the vehicle (1) with a cover inner side (11.1) and a cover outer side (11.2), an electronics unit (12) having a sensor unit (20) for detecting an actuation action (200) of the user for triggering the function of the vehicle (1), an electronics outer side (12.2), and an electronics inner side (12.1) facing the electronics outer side (12.2). A vehicle (1), and a method (100) are also provided.

19 Claims, 6 Drawing Sheets

Figure 1:
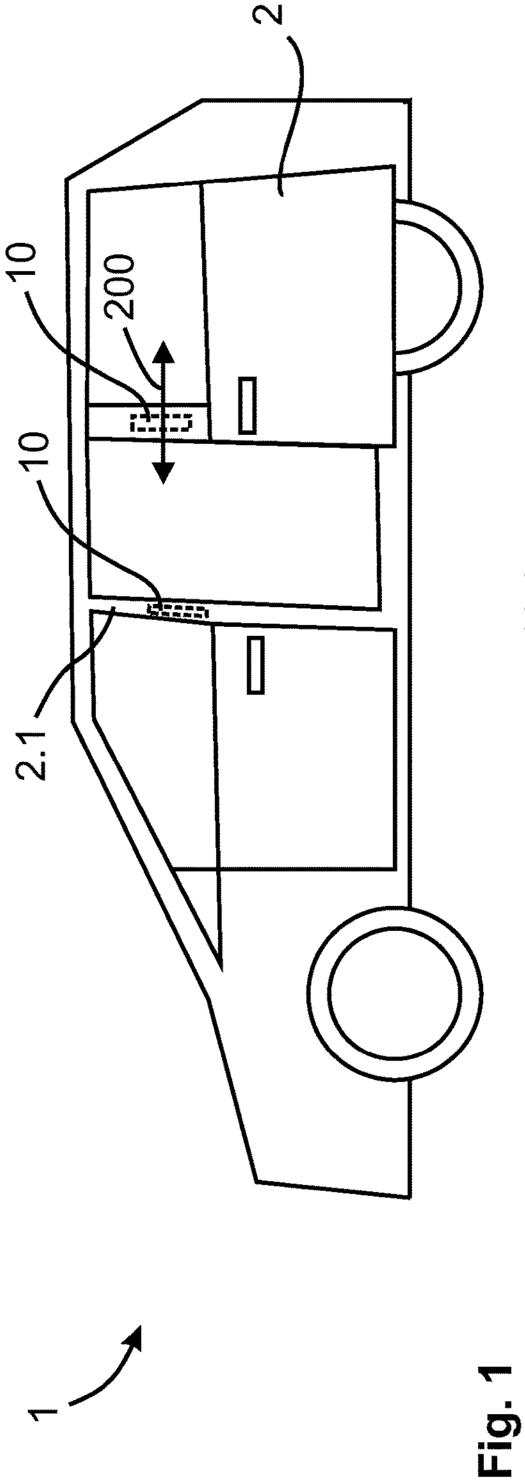

(52) U.S. Cl.
CPC ....... *E05Y 2400/86* (2013.01); *E05Y 2600/60* (2013.01); *E05Y 2900/531* (2013.01)

(56) References Cited

U.S. PATENT DOCUMENTS

| | | | | |
|---|---|---|---|---|
| 2019/0106173 | A1* | 4/2019 | Salvaggio, Jr. | B62J 35/00 |
| 2019/0169893 | A1* | 6/2019 | Scheiern | G01R 27/2611 |
| 2021/0123270 | A1* | 4/2021 | Spick | E05B 81/77 |
| 2021/0164281 | A1* | 6/2021 | Takata | E05B 81/77 |
| 2021/0302147 | A1* | 9/2021 | Chabrowski | E05B 81/77 |

FOREIGN PATENT DOCUMENTS

| | | | |
|---|---|---|---|
| FR | 2724686 | | 3/1996 |
| WO | WO2006060745 | A2 | 6/2006 |
| WO | WO2010008534 | A1 | 1/2010 |
| WO | WO2011007008 | A1 | 1/2011 |

* cited by examiner

ACTUATING DEVICE WITH COVER ELEMENT, VEHICLE, AND METHOD

The invention relates to an actuating device, a vehicle and a method.

Prior art actuating devices for vehicles are known in which a user can trigger a vehicle function by an actuation action. It is known to use proximity sensors to detect an approach of a user and, for example, to unlock a door lock of a vehicle door so that the user can conveniently open the vehicle door. Such proximity sensors are usually integrated into a door handle. Due to their geometry, door handles offer the advantage that they allow simple encapsulation of the sensor technology in order to protect the sensor technology from moisture and other environmental influences. However, if the sensor system is to be arranged on another vehicle part, such as a body component, for example, such encapsulation cannot be easily transferred to the body component due to the planar extension of the vehicle part.

It is an object of the present invention to at least partially eliminate the above-mentioned disadvantages known from the prior art. In particular, it is an object of the present invention to enable sealing of a sensor unit on a planar vehicle part of a vehicle, preferably outer side of a door handle of the vehicle, with improved manufacturing possibilities and/or improved ease of use.

The foregoing problem is solved by an actuating device having the features of the present disclosure, a vehicle having the features of the present disclosure, and a method having the features of the present disclosure. Further features and details of the invention result from the respective dependent claims, the description and the drawings. In this context, features and details described in connection with the actuating device according to the invention naturally also apply in connection with the vehicle according to the invention and/or the method according to the invention, and vice versa in each case, so that reference is or can always be made mutually with regard to the disclosure concerning the individual aspects of the invention.

In accordance with a first aspect of the invention, an actuating device for triggering a function of a vehicle by a user is provided. The actuating device comprises a planar cover element for a vehicle part of the vehicle. The cover element comprises a cover inner side and a cover outer side. Further, the actuating device has an electronics unit having a sensor unit for detecting an actuation action of the user to trigger the function of the vehicle. The electronics unit has an electronics outer side and an electronics inner side, the electronics inner side being opposite to the electronics outer side. Further, the electronics unit has the electronics outer side oriented toward the cover inner side and arranged on the cover element to detect the actuation action on the cover outer side. A first sleeve section for protecting the electronics inner side is attached to the cover element, so that the cover element and the first sleeve section form a closed sleeve for protecting the electronics unit.

The vehicle component function may include, for example, unlocking a door lock, opening a vehicle door, and/or turning on a light and/or an electrical device. The vehicle component may comprise, for example, an outer component or an inner component of the vehicle.

The planar design/configuration of the cover element can be understood in particular as meaning that the cover element has a planar, in particular sleeve-like, extension. For example, the cover element can have a thin-walled design/configuration. The cover element may in particular be a panel for a body component of the vehicle. For example, an outer surface of the vehicle component may be formable by the cover element. The outer surface may be an inner surface or an outer surface of the vehicle. Preferably, the cover element may form a visible surface of the vehicle part. For example, the cover element may be arrangeable behind a pane of glass, in particular with respect to an outer surface of the vehicle. In this case, the actuating device is preferably arranged on a door of the vehicle, in particular a side door and/or sliding door. As a result, optical and/or electromagnetic signals can be transmitted to a user located in front of the vehicle part and/or can be received by the user through the sensor unit. Preferably, the cover element may be integrable into a body surface and/or an optic of a body surface of the vehicle, in particular to enable the opening of a side door of the vehicle as a function triggerable by the actuation action. It is conceivable that the cover element can be integrated into a B-pillar of the vehicle. Consequently, in this case the actuating device is optionally arranged on the B-pillar. In particular, the cover element has a plastic or is made of a plastic. Due to the sensor unit, the cover element can be designed/configured without a handle and/or switch. In particular, the cover inner side faces the cover outer side with respect to the cover element. For example, the vehicle part can have a cover inner side in which electrical components can be arranged. In this case, the inner side of the cover can be oriented in particular towards the inner side of the cover.

In particular, the electronics unit can have several conductor tracks and/or electronic components, preferably in the form of semiconductor elements, to process electrical signals. Furthermore, the electronics unit may have a power source for supplying power to the sensor unit and/or a connection for connection to a vehicle power supply. For example, it is conceivable that the sleeve comprises a cable outlet through which cables can be guided from the electronics unit to an outer side of the sleeve. This can ensure a connection between the electronics unit and a vehicle electronics system and/or a vehicle power supply. Preferably, the electronics unit has a planar extension. In particular, a longitudinal side of the electronics unit can be oriented vertically and/or horizontally on the vehicle part. The electronics inner side and the electronics outer side can, for example, each comprise a side of a circuit board of the electronics unit on which electrical components are arranged. In particular, the electronics inner side is opposite the electronics outer side with respect to the electronics unit. The electronics inner side may further be oriented facing away from the cover element. In this regard, the sensor unit may preferably be oriented such that the actuation action is detectable on the electronics outer side, in particular when the user is located on the electronics outer side on the vehicle or in the vicinity of the vehicle. By the fact that the actuation action is detectable on the outer side of the fairing, it can be understood in particular that the actuation action is detectable on a surface of the outer side of the fairing element and/or that the actuation action is detectable at a distance from a surface of the outer side of the fairing. It is conceivable that the sensor unit is designed/configured, for example, for capacitive, inductive and/or optical detection of the actuation action and/or for detection of the actuation action by means of ultrasound. The sensor unit can preferably be designed/configured for motion detection, in particular for gesture detection, at a distance, in particular from 1 cm to 20 cm, preferably from 2 cm to 15 cm, particularly preferably from 5 cm to 10 cm, from the actuating device.

The first cover section can be fastened directly or indirectly to the cover element. For example, the first sleeve section can be formed by a housing sleeve that is fastened to the cover element with a sealing compound. In particular, the first sleeve section can be caulked or screwed to the cover element. This can provide an advantageous fastening option, in particular under pretension. However, it is also conceivable that the first sleeve section is applied to the electronics unit and the cover element in at least partially liquid form. In particular, the cover may thus form a closed housing. Preferably, the cover element and/or the first sleeve section and the electronics unit are configured in such a way that the electronics unit can be arranged in at most two orientations, preferably in only one orientation, between the cover element and the first sleeve section. For this purpose, the electronics unit and the cover element and/or the first sleeve section can have positioning aids, in particular in the form of asymmetrical recesses and/or projections. In this way, incorrect assembly can be intuitively prevented.

Furthermore, in an actuating device according to the invention, it is conceivable that the sensor unit, the electronics unit and/or the casing is designed/configured at least partially or completely symmetrically, in particular with respect to a central plane of the actuating device, as a result of which the actuating device can be optionally mounted on two opposite sides of the vehicle. For example, for use on different sides of the vehicle, only a reprogramming of a control unit of the electronics unit can be carried out. Furthermore, it is conceivable that a switch can be switched over, by means of which an arrangement on the left or right side in the direction of travel is determined. Depending on the side of the vehicle, for example, the direction of the actuation action for triggering the function of the vehicle and/or a display sequence of an information unit can be defined. In the case of sliding doors on both sides, for example, both doors can open towards the rear of the vehicle, so that a mirrored actuation action is expected in each case along the opening direction for automatic opening of the respective sliding door.

The electronics unit with the sensor unit is thus protected by the cover element, particularly on the outer side of the electronics. This means, for example, that a separate, complete housing for the electronics unit is not necessary. Furthermore, the actuating device can be adapted in a cost-effective manner for planar vehicle parts of any shape. For example, it is conceivable that the electronics unit is not arranged until the vehicle part is mounted on the cover element. This allows greater flexibility in the manufacture of the actuating device.

Furthermore, in an actuating device according to the invention, it can advantageously be provided that the first sleeve section has a casting compound or a lid element, in particular wherein the first sleeve section is connected to the cover element by a material bond. In particular, the electronics unit and the cover element can be directly cast with the casting compound. In particular, the casting compound may comprise an epoxy resin and/or an acrylate in order to protect the electronics unit from environmental influences, in particular from moisture. In particular, the casting compound may be transparent or opaque and/or opaque. The casting compound may implement a material bond of the first sleeve section with the cover element. In particular, the electronics inner side and/or the electronics outer side may be completely covered with casting compound. Preferably, at least the sensor unit is completely covered with casting compound. Between the lid element and the cover element, a seal can be realized by a sealing means/element, in particular running around the lid element. The sealant may, for example, comprise a silicone or a sealing adhesive. Furthermore, the sealing means/element can at the same time form a material-bonding fastening of the lid element to the cover element. The first sleeve section can be bonded, welded, in particular friction-welded and/or laser-welded, to the cover element.

Furthermore, in an actuating device according to the invention, it can advantageously be provided that the cover element has an electronics receptacle for receiving the electronics unit, in particular wherein the electronics unit is fastened in the electronics receptacle to the cover element in a form-fitting and/or material-bonding manner. For a form-fitting reception of the electronics unit in the electronics receptacle, a shape of the electronics receptacle can correspond to a shape of the electronics unit and/or a frame for the electronics unit. Preferably, the cover element may be a casting, in particular an injection-molded part. As a result, the electronics receptacle can be formed in a simple manner on the inner side of the fairing. In particular, the electronics receptacle is integral and of the same material as the cover inner side and/or the cover outer side of the cover element. In particular, it may be provided that the electronics unit is caulked to the cover element and/or the lid element.

Preferably, in an actuating device according to the invention, it can be provided that the electronics unit has a circuit board, preferably in the form of a circuit board, with at least one, in particular capacitive or inductive, sensor element of the sensor unit for detecting the (preferably contactless) actuation action, in particular with the sensor element being arranged on the outer side of the electronics on the circuit board. In particular, the circuit board forms a base for the electronics unit. Preferably, the circuit board is a multilayer circuit board. The sensor element may in particular be a sensor electrode. For example, the sensor element may comprise an electrical coil or a sensor surface in the form of an electrically conductive surface. As a result, a capacitive or inductive change in an electromagnetic field can be detectable. Corresponding to the sensor element, a shielding element, in particular in the form of a shield electrode, can be arranged on the inner side of the electronics, through which an electric field of the sensor element can be alignable. Furthermore, it is conceivable that the sensor element is surrounded by a shielding element on the outer side of the electronics, through which an electric field of the sensor element can be aligned. Furthermore, it is conceivable that the electronics unit has several circuit boards on which various electronic components are distributed.

Furthermore, in an actuating device according to the invention, it can advantageously be provided that the sensor unit has a plurality of sensor elements, in particular of the same type, for detecting the actuation action, whereby a direction of the actuation action can be identified. Preferably, the sensor elements may be arranged on the outer side of the electronics on the circuit board. For example, the sensor elements may be fabricated by a printing process and/or an etching process. The sensor elements can be inductive and/or capacitive. Additionally or alternatively, it is conceivable that the sensor elements are designed/configured for optical detection and/or for detection by means of ultrasound. The direction of the actuation action can be detected along an arrangement direction of the sensor elements, in particular on the outer side of the electronics. Thus, a gesture can be provided as the actuation action. For example, if the function of the vehicle is an opening of a sliding door of the vehicle, a gesture along an opening direction of the sliding door may be provided as the actuation action. Preferably, the sensor elements are arranged such that a horizontal gesture in front of the vehicle part leads to the triggering of the function of the vehicle by the sensor unit.

Furthermore, in an actuating device according to the invention, it is conceivable that the sensor elements are arranged in a regular pattern, preferably matrix-like and/or strip-like, on the circuit board. Due to the regular pattern, a gesture recognition for recognizing the actuation action may be simplified. A matrix-like arrangement can be understood as a two-dimensional arrangement of the sensor elements. For example, an arrangement of two by two sensor elements in one plane, in particular on the outer side of the electronics, may form the smallest matrix-like arrangement. In the strip-like arrangement, the sensor elements preferably have an elongated extension. In particular, in the strip-like arrangement, the sensor elements are arranged next to each other in a strip pattern. Thereby, a distance between the sensor elements can be constant. Preferably, the sensor elements in the strip-like arrangement on the circuit board form a pattern that extends in only one direction. Furthermore, it is conceivable that the sensor elements are arranged in an irregular pattern on the circuit board. By arranging the sensor elements in a pattern, an arbitrarily complex actuation action can be detectable in one plane. Furthermore, by arranging the sensor elements on a single circuit board, a construction unit can be enabled that is easy to handle during manufacturing and provides short signal paths for detecting the actuation action. It can also be simplified to manufacture the sensor elements using a printing or etching process.

Furthermore, in an actuating device according to the invention, it is conceivable that the electronics unit has an information unit by means of which the detection of the actuation action can be confirmed to the user on the outer side of the panel and/or a start of the actuation action can be signaled, in particular with the information unit being arranged on the circuit board. By means of the indication unit, an indication in the form of a signal can be output to the user that the user can start the actuation action and/or that the actuation action has been detected by the sensor unit. Thus, the hint unit can be used as, in particular, a contactless user interface. The indication in the form of the signal can be, for example, acoustic or optical. Likewise, it is conceivable that the indication in the form of the signal is made as a radio signal, for example to a smartphone or an electronic key of the user. Preferably, the indication unit is a unidirectional transmission unit. In particular, an input by the user can be made via the sensor unit. Thus, the hint unit and the sensor unit can form a dialogue unit for bidirectional communication with the user. By arranging the indication unit on the circuit board on which the sensor element is also arranged, manufacturing of the actuating device can be simplified and signal paths of the electronics unit can be simple and short.

It is further conceivable in an actuating device according to the invention that the indication unit is an optical indication unit and that the cover element has at least one light transmitting window region through which an optical signal can be transmitted to the user by the indication unit. Preferably, the window area comprises one or more transparent portions. For example, the window area may comprise at least one recess in a cover material of the cover element that is closed by a light-transmissive material. As a result, a seal of the cover may be maintained and the indication unit may be disposed within the cover. The cover element may be a two-component plastic injection molding. Preferably, a transparent material may be molded in the window area to an opaque and/or opaque cover material of the cover element. Also, the entire cover element may be made of the transparent material, with a non-transparent area (non-window area) being made light-absorbing or opaque by a film and/or paint and/or coating.

Preferably, in an actuating device according to the invention, it can be provided that the information unit has a plurality of light emitters for emitting an optical signal to the user, in particular wherein the light emitters are separated from one another at least in regions by opaque separating sections. By means of several light emitters, more complex information can be transmitted to the user as an indication. For example, the indication that can be transmitted by the indication unit can comprise a direction or the like. In particular, the light emitters can be dynamically controllable so that a dynamic display progression can be realized. The light emitters may be illuminants, in particular in the form of LEDs. Furthermore, it is conceivable that the information unit comprises an LED or OLED display and the light emitters are formed by individual display elements. By means of a display, display symbols of different complexity may be displayable to a user in order to be able to convey information to a user about an expected actuation action, a confirmed actuation action and/or the like. In particular, the window area may include a plurality of light transmitting sections separated from each other by the separating sections, particularly in the form of opaque and/or opaque material sections. The separating sections may be integrally formed with the cover member or separately formed from the cover member. For example, an intermediate element may be provided, in particular in the form of an insert, which comprises one of the separation sections or a plurality of separation sections. The intermediate element may be formed, for example, from sponge rubber or another flexible material. Preferably, the intermediate element has closed pores. As a result, the intermediate element can be formed to be non-water-attracting. The separating sections may improve distinguishability of the light source behind from a cover outer side. Preferably, the separating sections may extend between the light sources in a rib-like manner. The separating sections may direct light from the light emitters in a direction so that a user can associate the light with one of the light emitters, which may result in a clearer path when the light emitters are dynamically activated. Preferably, an encapsulated space is formed around each or group of the light emitters by the separating sections. For this purpose, the separating sections can be formed circumferentially around the light emitters and/or make sealing contact with the circuit board. In this way, for example, the outer side of the electronics can be covered with encapsulant by filling a gap between the electronics unit and the cover element without covering the light emitters with, in particular, opaque and/or opaque encapsulant.

Furthermore, in an actuating device according to the invention, it is conceivable that the electronics unit is enclosed in a frame with which the electronics unit can be positioned on the cover element. The frame can form an adapter for a form fit of the circuit board in the electronics receptacle. Preferably, the frame has form fit elements, in particular in the form of latching elements, for receiving the circuit board. Furthermore, it is conceivable that the electronics unit has a plurality of circuit boards which are arranged together in the frame and thereby form, in particular, a common assembly. This can simplify handling of the electronics unit during assembly on the cover element. Thus, an assembler can grip the frame when mounting the electronics unit on the cover element without touching the electronic components of the electronics unit. In particular, the frame is a plastic component.

Preferably, an actuating device according to the invention can provide that the electronics outer side of the electronics unit is covered with casting compound, in particular wherein the frame and/or the electronics unit has at least one receiving means/element for a casting nozzle for casting compound, so that the casting compound can be conveyed from the electronics inner side to the electronics outer side while the electronics unit is arranged on the cover element. By casting the outer side of the electronics unit with the casting compound, a space between the electronics unit and the cover element can be filled with casting compound. This prevents moisture from collecting in the intermediate space and thereby negatively affecting a measurement of the sensor unit. The receiving means/element allows casting compound to be reliably applied to the outer side of the electronics after the electronics unit has been arranged on the cover element. A casting nozzle can be understood as a tool or part of a tool for distributing casting compound. In particular, several receiving means/element for the casting nozzle can be provided circumferentially around a circuit board of the electronics unit on the frame. This can enable reliable and homogeneous distribution of the casting compound in the interstitial space. Additionally or alternatively, it is conceivable that an elastic intermediate element is arranged in an intermediate space between the electronics unit and the cover element. Preferably, the intermediate element has a material with closed pores. Furthermore, the intermediate element can be elastically prestressed against the cover element by the electronics unit. This means that the intermediate element can also be used to fill the intermediate space and prevent moisture from penetrating.

Furthermore, in an actuating device according to the invention, it can advantageously be provided that the electronics unit has a touch sensor for detecting a pressure on the cover element, whereby a further function of the vehicle can be triggered, in particular wherein the touch sensor comprises an LDC sensor (inductive-action sensor). The touch sensor may enable a further actuation action of the user. The further function of the vehicle may be, for example, a locking and/or unlocking of a lock. Additionally or alternatively, the touch sensor may enable an emergency stop to be effected in the event of automatic opening and/or closing of a door. For example, an electrically conductive target element can be provided on the cover element, the change in distance of which can be registered by the touch sensor when the user presses on the vehicle part and/or the cover element. Preferably, a plurality of LDC sensors may be provided, in particular to enable detection of the further actuation action to be verified and/or over a wider actuation range on the vehicle part and/or the cover element. If, for example, provision is made for the function that can be triggered by the sensor unit to be enabled only after the further function has been activated, the probability of false triggering can be significantly reduced.

Furthermore, in an actuating device according to the invention, it can advantageously be provided that the electronics unit has an identification means/device for identifying the user, in particular wherein the identification means/device has a radio element for contactless data exchange with an ID transmitter. The ID transmitter may be understood to mean, for example, a smartphone and/or an electronic key of the user. In particular, the identification means/device may comprise an NFC interface (Near Field Communication interface), a BLE interface (Bluetooth Low Energy interface) and/or UWB interface (Ultra-wideband interface). This may enable authentication of the user by the identification means/device. In particular, the identification means/device may be capable of being in communication with a vehicle control unit to identify the user. In particular, the identity check can be executable by the vehicle control unit on the basis of the data exchange of the identification means/device with the ID transmitter.

Preferably, in an actuating device according to the invention, it can be provided that the electronics unit has a proximity sensor for detecting an approach of a user, in particular wherein the proximity sensor is designed/configured for capacitive detection of the approach. Thus, the proximity sensor can in particular provide a further capacitive sensor in addition to the sensor unit. By means of the proximity sensor, for example, the sensor unit, the touch sensor and/or the identification means/device can be awakened when the approach of the user is detected. This may allow energy to be conserved during operation of the actuating device. Further, the proximity sensor may be capable of activating the notification unit when the proximity is detected. For example, an activation state of the actuating device can thereby be signaled to a user.

Furthermore, in an actuating device according to the invention, it can advantageously be provided that the circuit board has several conductor layers, with the sensor unit being arranged on a first conductor layer and the touch sensor and/or the identification means/device being arranged on a further conductor layer. In this case, the conductor layers can be electrically insulated from one another. In particular, a sensor plane can be formed by each of the conductor layers. In this way, a compact design/configuration of the circuit board and/or the electronics unit can be achieved.

Furthermore, in an actuating device according to the invention, it can advantageously be provided that the electronics unit has a control unit for evaluating sensor signals from the sensor unit and for actuating the indicator unit as a function of the sensor signals. For example, the sensor signals of the sensor unit can be digitized and forwarded by the control unit directly in the electronics unit. Furthermore, it is conceivable that a direction of the actuation action can be detected by the control unit on the basis of the evaluation of the sensor signals. The evaluation of the sensor signals in the electronics unit can enable short signal paths. In addition, the information unit can be controlled as a function of the sensor signals, whereby the user can be provided with feedback on the detection of the direction of the actuation action.

According to another aspect of the invention, a vehicle is provided. The vehicle has an actuating device, in particular an actuating device according to the invention, for triggering a function of the vehicle by a user. The actuating device comprises a planar cover element of a vehicle part of the vehicle, having a cover inner side and a cover outer side. Further, the actuating device comprises an electronics unit having a sensor unit for detecting an actuation action of the user to trigger the function of the vehicle. The electronics unit has an electronics outer side and an electronics inner side, the electronics inner side being opposite the electronics outer side. Further, the electronics unit is oriented with the electronics outer side facing the cover inner side and is arranged on the cover element to detect the actuation action on the cover outer side. Further, a first sleeve section for protecting the electronics inner side is attached to the cover element so that the cover element and the first sleeve section form a closed sleeve for protecting the electronics unit.

Thus, a vehicle according to the invention brings the same advantages as have been described in detail with reference to an actuating device according to the invention. Preferably, the vehicle is a motor vehicle. Preferably, the vehicle part further comprises a B-pillar of the vehicle and/or an inner part of the vehicle. The function that can be triggered by the actuating device may comprise an automatic movement of the vehicle part. For example, the electronics inner side may be oriented in the direction of a vehicle inner side of the vehicle and the electronics outer side may be oriented in the direction of a vehicle outer side if the cover element is a cover outer side of the vehicle. Furthermore, the electronics inner side can be oriented, for example, in the direction of a vehicle outer side and the electronics outer side can be oriented in the direction of a vehicle inner side of the vehicle if the cover element is a cover inner side of the vehicle.

Thus, the electronics unit with the sensor unit is protected by the cover element, allowing the actuating device to be mounted on the vehicle part in a cost-effective manner. Furthermore, the design/configuration freedom of the cover element can be increased if the electronics unit is not arranged on the cover element until the vehicle part is mounted. This can also result in greater overall flexibility in the manufacture of the actuating device.

Furthermore, in a vehicle according to the invention, it can advantageously be provided that the vehicle part is a door, in particular in the form of a sliding door, of the vehicle, wherein an opening means/element is provided for automatically opening the door as a function of the actuation action. As a result, the actuating device can also be moved along with the door when the door is opened, resulting in intuitive operation by the user when the user can perform the actuation action directly on the opened or closed door. In particular, the vehicle part can be designed/configured without handles.

According to a further aspect of the invention, a method of manufacturing an actuating device, in particular an actuating device according to the invention, for triggering a function of a vehicle, in particular a vehicle according to the invention, by a user, comprising the following steps/stages:

Providing a planar cover element for a vehicle part of a vehicle having a cover inner side and a cover outer side, Providing an electronics unit having a sensor unit for detecting an actuation action of the user to trigger the function of the vehicle, Arranging the electronics unit on the cover element so that an electronics outer side of the electronics unit is oriented toward the cover inner side of the cover element, Attaching a first sleeve section for protecting the inner side of the electronics to the cover element so that the cover element and the first sleeve section form a closed sleeve for protecting the electronics unit.

Thus, a method according to the invention entails the same advantages as have already been described in detail with reference to an actuating device according to the invention and/or a vehicle according to the invention. Preferably, when the planar cover element is provided, it is produced as a casting, in particular a multi-component plastic injection-molded part. When providing the electronics unit, a circuit board can be equipped with electronic components, printed. Additionally or alternatively, electronic components can be etched when providing the electronics unit. When attaching the first sleeve section to the cover element, a materially bonded connection of the first sleeve section to the cover element can be obtained. Thus, the electronics unit with the sensor unit is protected by the cover element, whereby the actuating device can be mounted on the vehicle part in a cost-effective manner.

Preferably, in a method according to the invention, it can be provided that the first sleeve section is formed by a casting compound that is cast with the electronics unit and the cover element. In this way, a materially-bonded connection between the first sleeve section and the cover element can be realized in a simple manner. In particular, when the casting compound is poured, the inner side of the electronics unit and the outer side of the electronics unit can be covered with casting compound. Preferably, an intermediate space between the cover element and the electronics unit is completely or substantially completely filled with casting compound. In this way, moisture in the area of a measuring field of the sensor unit can be prevented in order to improve reliable operation of the sensor unit.

Figure 2:
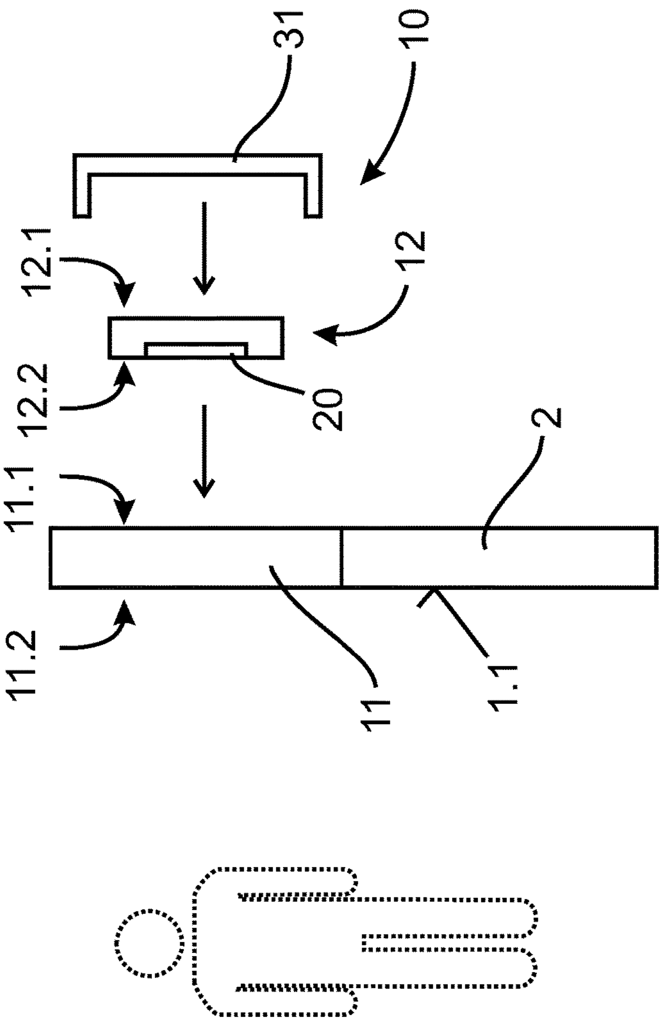
Figure 3:
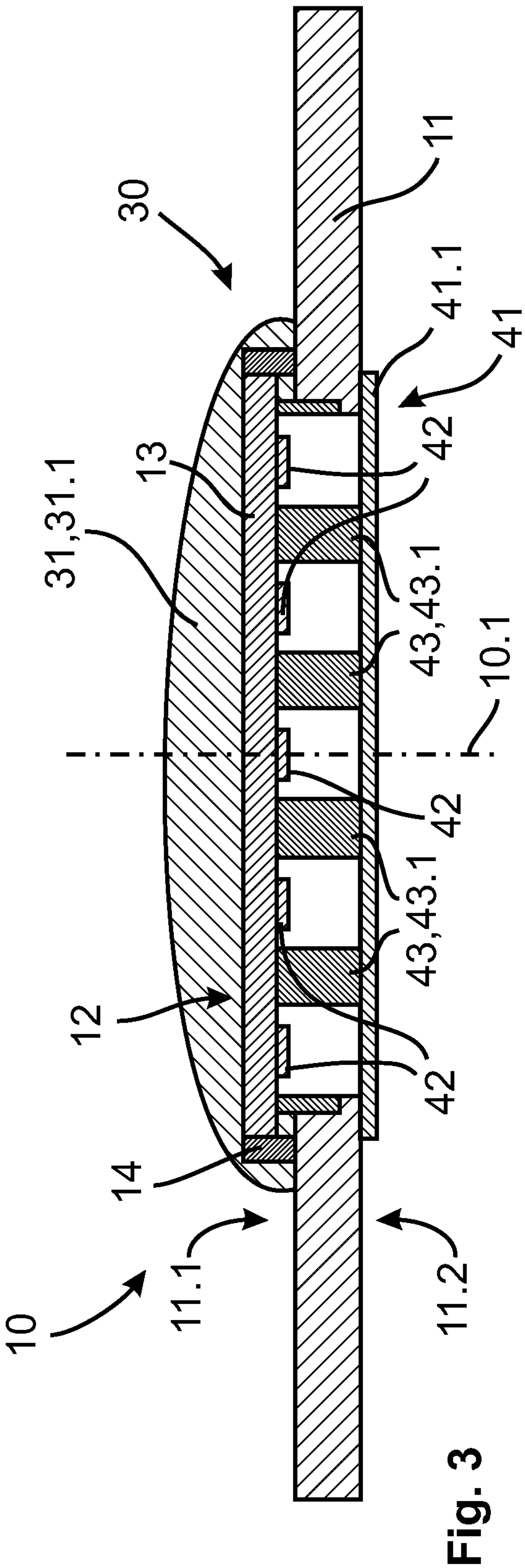
Figure 4:
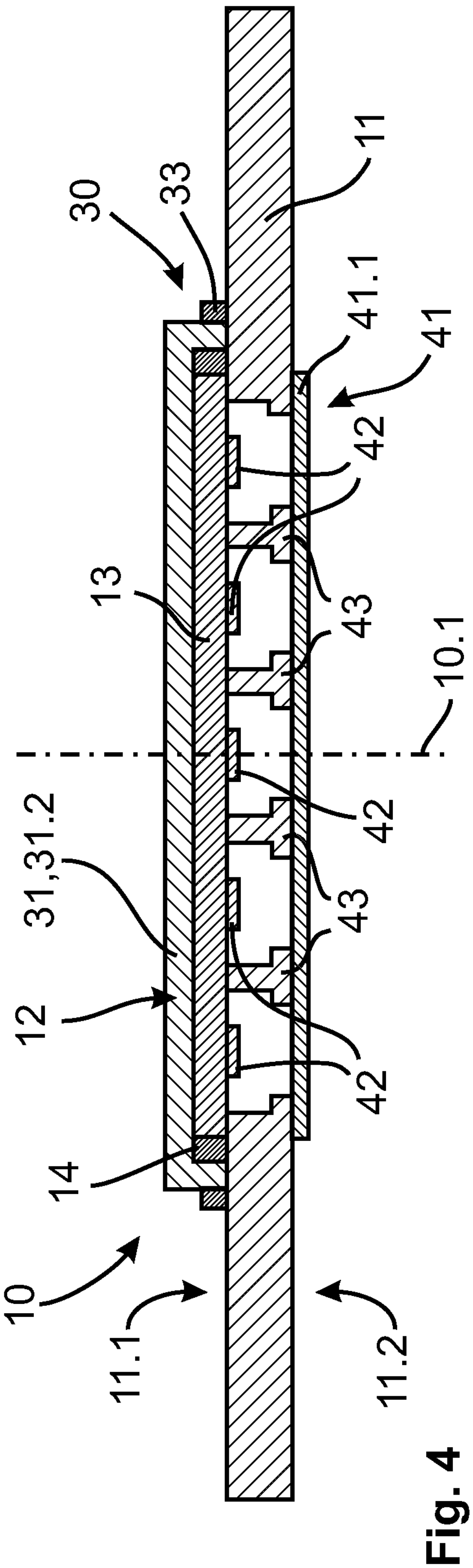
Figure 6:
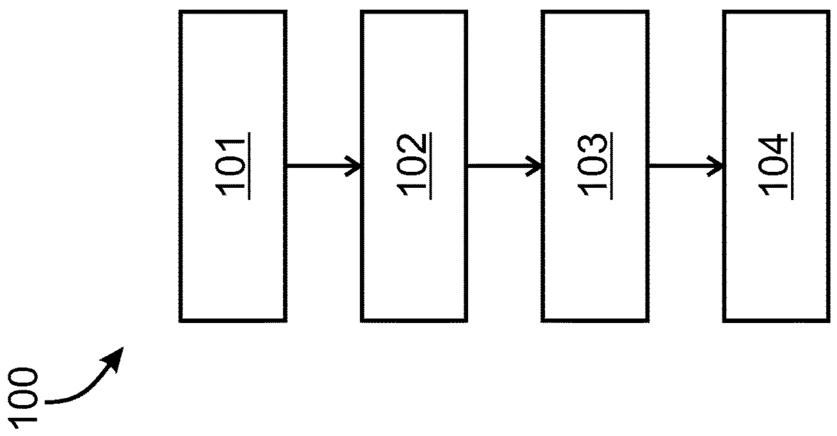
Figure 5:
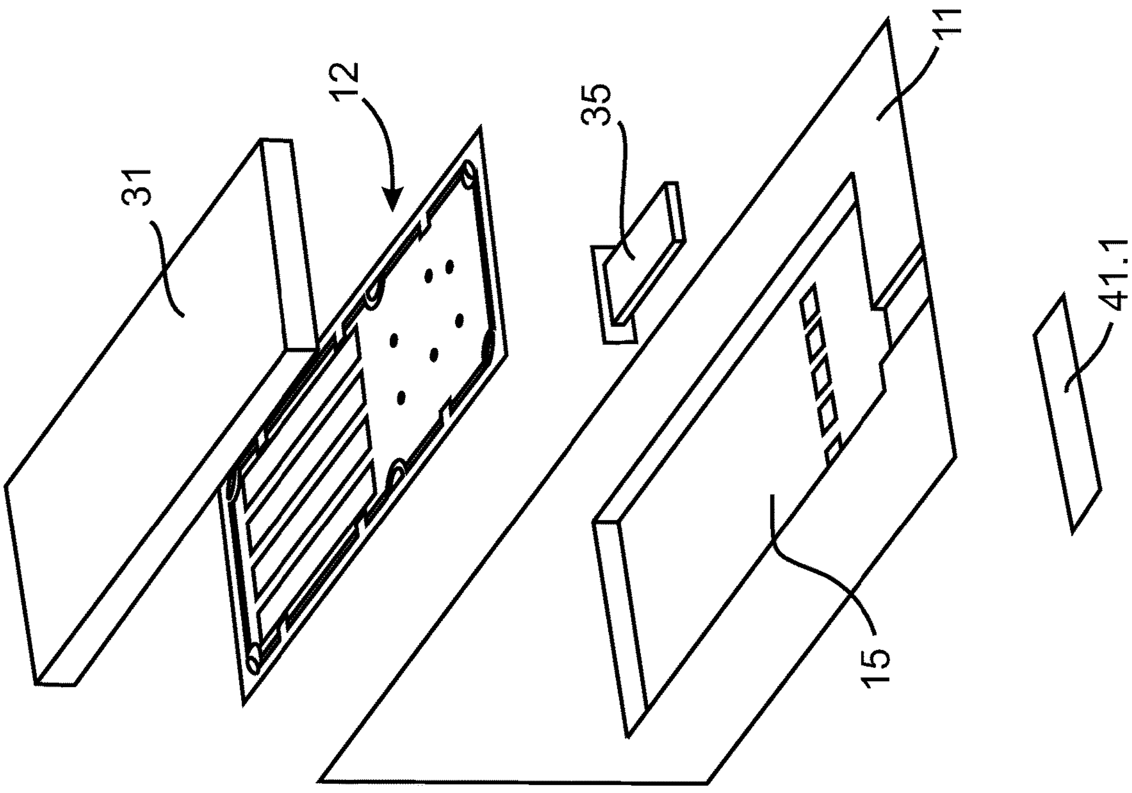
Figure 8:
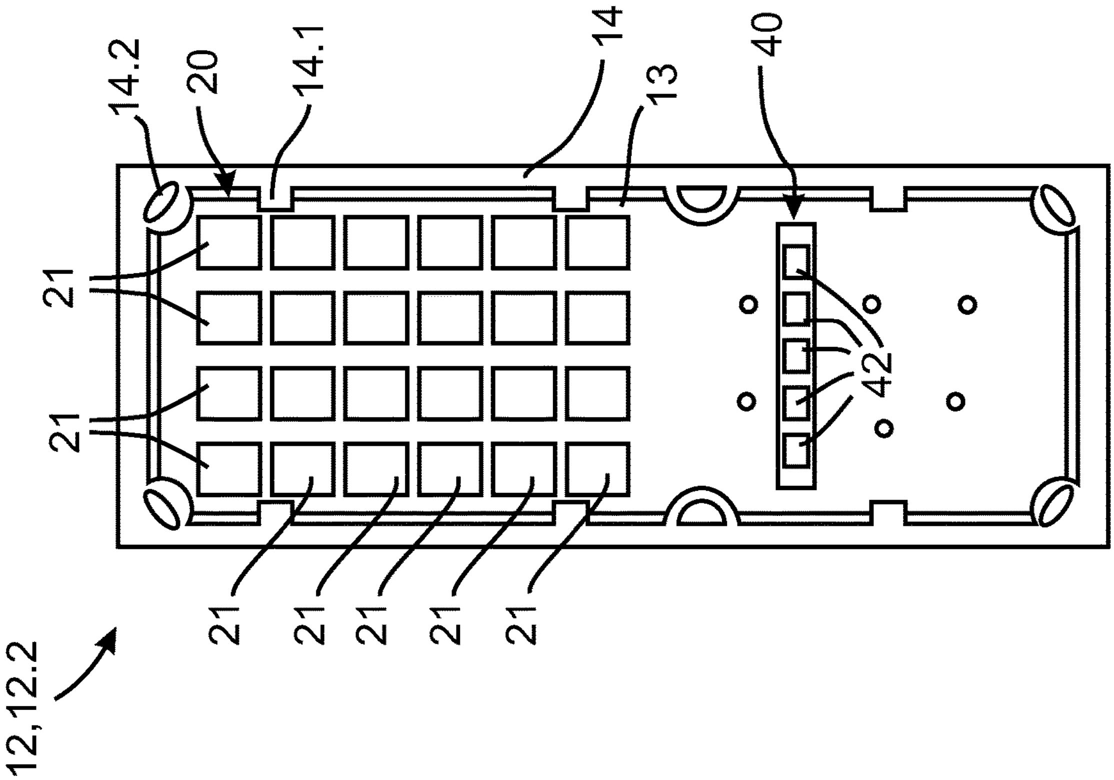
Figure 7:
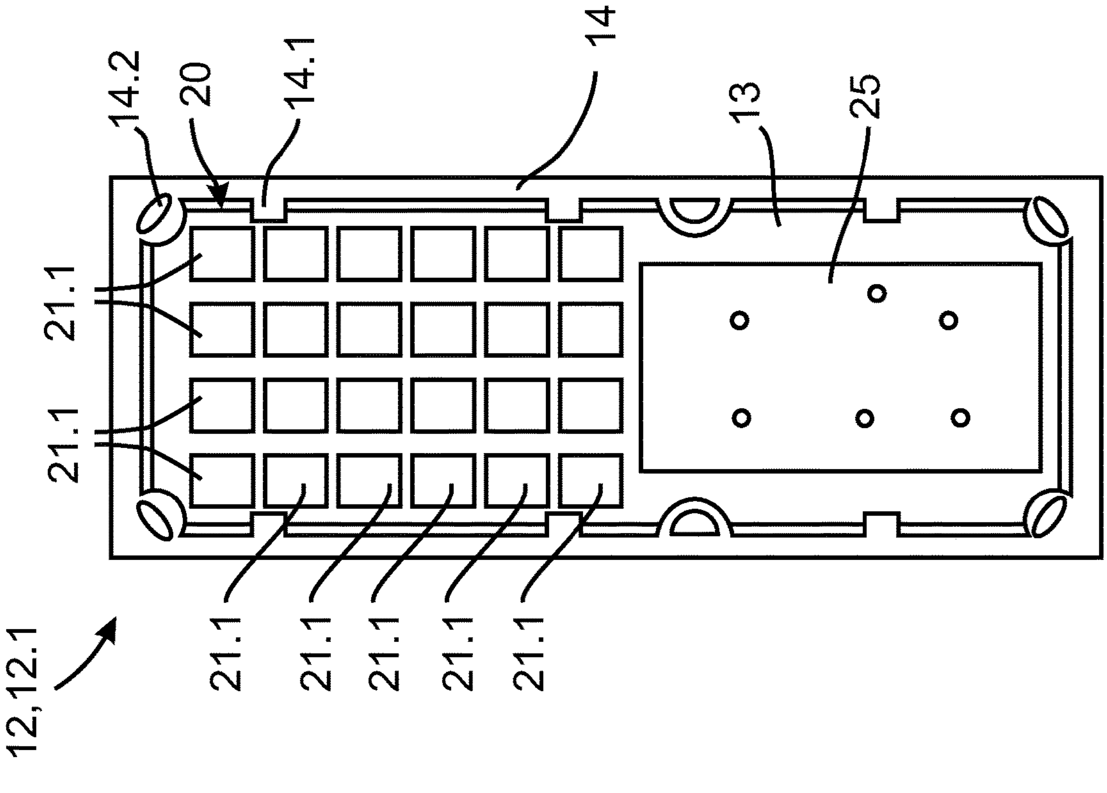
Figure 10:
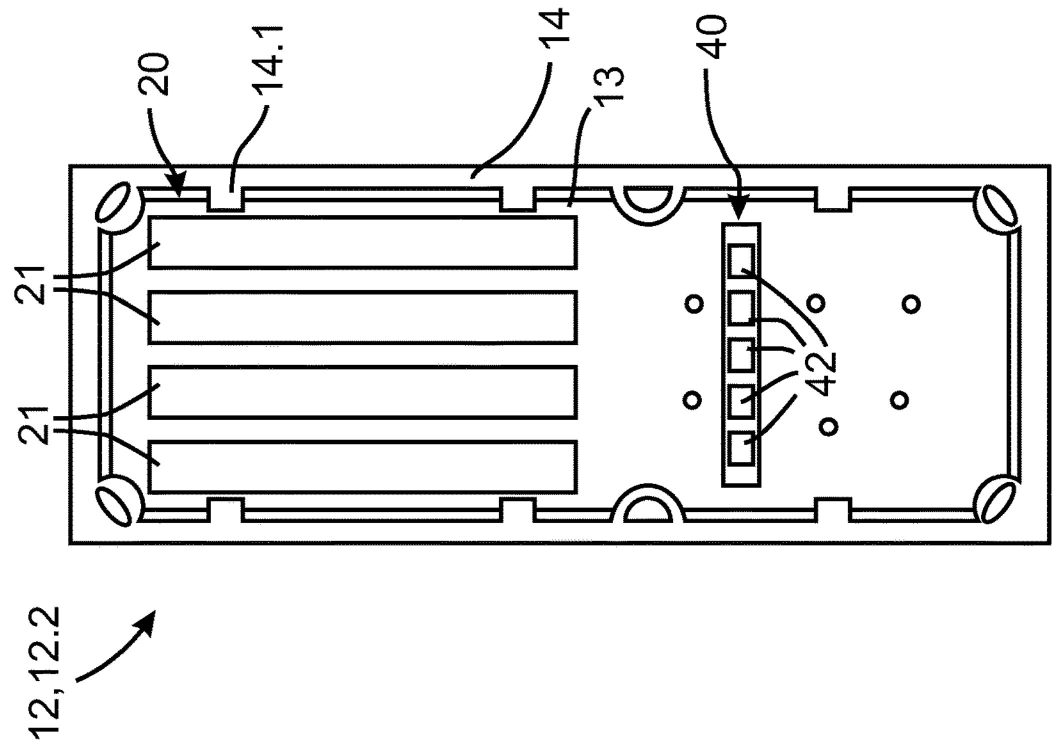
Figure 9:
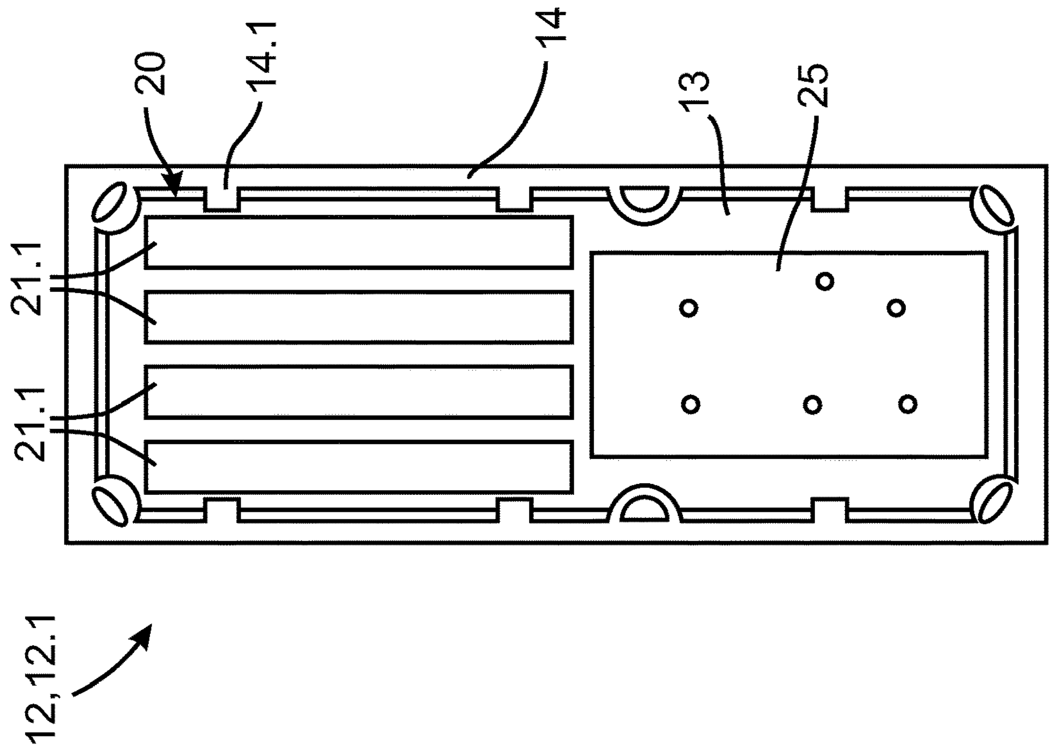
Figure 13:
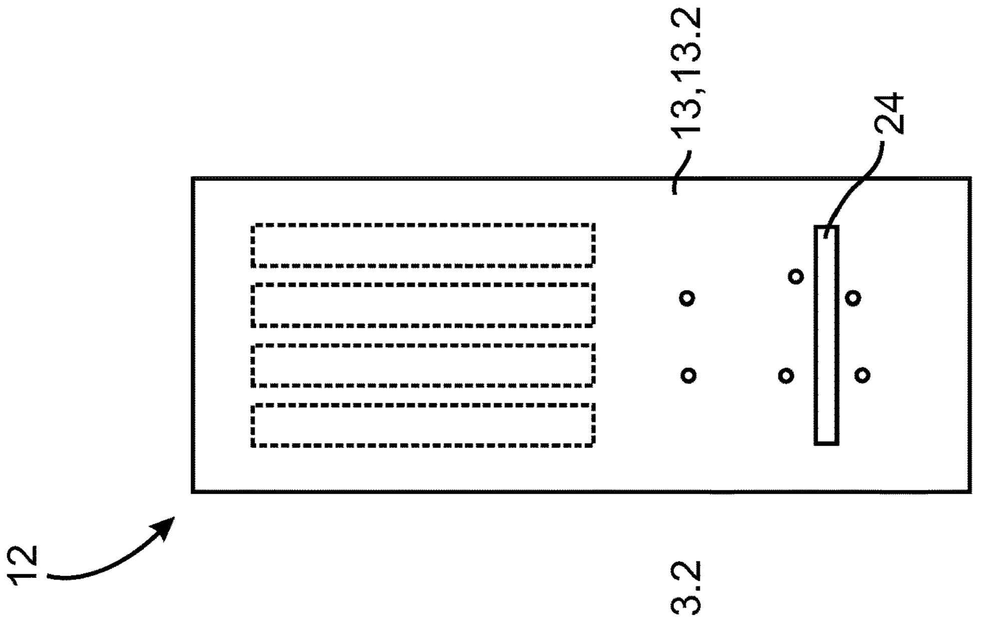
Figure 12:
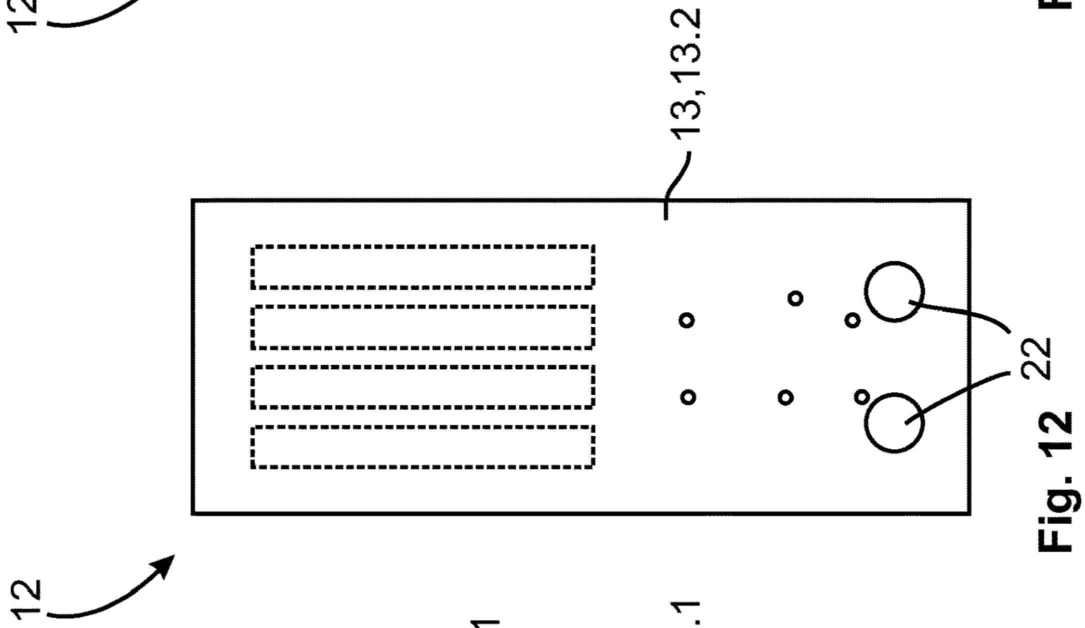
Figure 11:
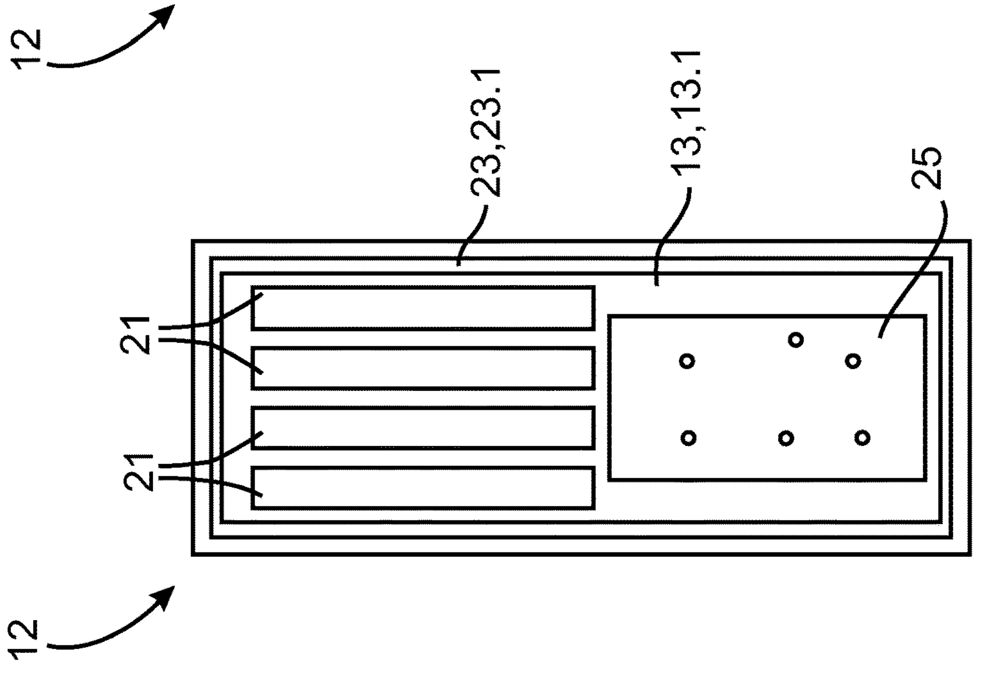

Further advantages, features and details of the invention will be apparent from the following description, in which embodiments of the invention are described in detail with reference to the drawings. In this connection, the features mentioned in the claims and in the description may each be essential to the invention individually or in any combination. It shows schematically:

FIG. 1 a vehicle according to the invention with an actuating device according to the invention in a first embodiment example FIG. 2 a schematic exploded view of the actuating device, FIGS. 3-4 different embodiments of the actuating device in sectional view, FIG. 5 another schematic exploded view of an actuating device or, FIG. 6A schematic representation of the method steps/stages according to the invention, FIGS. 7-8 show an electronics unit of the actuating device in a further example, FIGS. 9-10 an electronics unit of the actuating device in a further embodiment, FIGS. 11-13 Different conductor layers of a circuit board of the electronics unit.

In the following description of some embodiments of the invention, the identical reference signs are used for the same technical features even in different embodiments.

FIG. 1 shows a vehicle 1 according to the invention in a first embodiment with a vehicle part 2, which is designed/configured in particular as a vehicle door in the form of a sliding door. Thereby, the vehicle 1 further comprises an actuating device 10 for triggering a function of the vehicle 1. The actuating device 10 can thereby—as shown by way of example—be arranged on a B-pillar 2.1 and/or on a vehicle part 2, in particular in the form of a door or sliding door, of the vehicle 1. The function may, for example, be an automatic opening and/or closing of the sliding door. In this case, the function is performed in particular as a function of an actuation action 200 of a user. For example, an actuation action 200 in the form of a gesture along an opening direction of the vehicle part 2 can initiate the opening of the vehicle part 2 or an actuation action 200 in the form of a gesture in the opposite direction to the opening direction can initiate the closing of the vehicle part 2.

As shown in FIG. 2, the actuating device 10 has a planar cover element 11 of the vehicle part 2. The planar configuration of the cover element 11 may extend, for example, along a portion of the body of the vehicle 1 or behind a glass pane of the vehicle part 2. The cover element 11 comprises a cover outer side 11.2 and a cover inner side 11.1. The cover outer side 11.2 preferably forms a surface of the vehicle part 2 visible from outside the vehicle 1 and/or a part of a body surface 1.1. For example, the cover element 11 may be part of a cover in the region of a B-pillar 2.1 of the vehicle 1. An electronics unit 12 is arranged, in particular directly, on the cover element 11 and has an electronics outer side 12.2 and an electronics inner side 12.1. The electronics outer side 12.2 is oriented towards the cover inner side 11.1 of the cover element 11. The cover inner side 11.1 is opposite the cover outer side 11.2. In particular, the cover inner side 11.1 is oriented towards a vehicle inner side of the vehicle 1 and/or a cover inner side 11.1 of the vehicle part 2. However, it is also conceivable that the cover element 11 is part of a cover inner side 11.1 of the vehicle 1. In this case, the electronics inner side 12.1 can be oriented towards an outer side of the vehicle 1, for example.

Furthermore, the electronics unit 12 has a sensor unit 20 for detecting the actuation action 200 of the user. The sensor unit 20 is preferably arranged on the electronics outer side 12.2 of the electronics unit 12, in particular so that only the cover element 11 is located between the sensor unit 20 and the cover outer side 11.2. Due to the arrangement of the electronics unit 12 on the cover inner side 11.1 of the cover element 11, the electronics outer side 12.2 is protected by the cover element 11. To protect the electronics inner side 12.1, the actuating device 10 further comprises a first sleeve section 31 which is directly or indirectly attached to the fairing element 11, so that the fairing element 11 and the first sleeve section 31 form a closed sleeve 30. Possible embodiments of the sleeve 30 are shown by way of example in FIGS. 3 and 4.

FIG. 3 shows a sleeve 30 in which the first sleeve section 31 is formed by a casting compound 31.1. A circuit board 13 of the electronics unit 12 is also enclosed in a frame 14, by means of which the electronics unit 12 can be handled more easily during assembly and/or can be materially-bonded to the cover element 11. The casting compound 31.1 is thereby form-fittingly to the cover element 11 and preferably completely covers the electronics inner side 12.1. Furthermore, in particular also the electronics outer side 12.2 is at least partially or completely covered with the casting compound 31.1, so that at least the sensor unit 20 is covered by the casting compound 31.1. Preferably, the sensor unit 20, the electronics unit 12 and/or the sleeve 30 is formed at least partially symmetrically with respect to an intermediate level 10.1, whereby the actuating device 10 can be optionally mounted on two opposite vehicle sides.

Furthermore, the electronics unit 12 has an information unit 40 by means of which the detection of the actuation action 200 can be confirmed to the user on the outer side of the cover 11.2 and/or a start of the actuation action 200 can be signaled. The information unit 40 comprises a plurality of light emitters 42 for emitting a visual signal to the user. The light emitters 42 may in particular be illuminants in the form of LEDs. The light emitters 42 are arranged in a row with respect to each other and separated by separation section 43. By arranging the light emitters 42 in a row, for example, a direction of the actuation action 200 detected by the sensor unit 20 can be indicated to a user by activating the light emitters 42 along the row one after the other. The separation section 43 may be formed by an intermediate element 43.1 arranged between the cover element 11 and the electronics unit 12. In particular, the separation section 43 are opaque and/or opaque, so that light emitted by the light emitters 42 can be guided separately to the cover outer side 11.2 for each light emitter 42. Preferably, the intermediate element 43.1 may further be elastic and biased against the circuit board 13 of the electronics unit 12. As a result, each of the light emitters 42 can be encapsulated, in particular circumferentially, so that when the electronics unit 12 is poured with the casting compound 31.1, the light emitters 42 remain free of casting compound 31.1. Furthermore, the cover element 11 comprises a light-transmitting window area 41 through which an optical signal of the information unit 40 can be transmitted to the user. For example, the window area 41 may comprise a transparent window material 41.1, in particular a transparent plastic. The transparent window material 41.1 may be injection-molded onto an opaque and/or opaque base material of the cover element 11, for example, as a plastic injection-molded component, during a production of the cover element 11.

Additionally or alternatively, the light emitters 42 can also be parts of a display or the like. Furthermore, it is additionally or alternatively conceivable that an acoustic indication or an indication in the form of radio signals can be output to the user by the information unit 40. It is further conceivable that the separation section 43 are formed by the cover element 11. As shown in FIG. 4, the separation section 43 can be formed integrally with the cover element 11. In this case, the separation section 43 preferably extend in a rib-like manner to the circuit board 13.

FIG. 4 further shows a sleeve 30, in which the first sleeve section 31 is formed by a, in particular rigid, lid element 31.2. The lid element 31.2 can, for example, comprise a hard plastic and be placed on the cover element 11 with the electronics unit 12 during assembly of the actuating device 10. In this case, a seal between the lid element 31.2 and the cover element 11 can advantageously be implemented by a sealing means/element 33, in particular running around the lid element 31.2. The sealing means/element 33 may, for example, comprise a silicone. Furthermore, the sealing means/element 33 can at the same time form a materially-bonded fastening of the lid element 31.2 to the cover element 11.

FIG. 5 shows a further exploded view of the actuating device 10, in which the cover element 11 has an electronics receptacle 15 for a form-fitting reception of the electronics unit 12, in particular with the frame 14. Furthermore, an connection 35 can be provided, by means of which the electronics unit 12 can be connected or is connected to a vehicle electronics system and/or vehicle power supply. For this purpose, the connection 35 may protrude from the sleeve 30. In particular, the connection 35 may be casted with the sealing means/element 33 and/or the casting compound 31.1.

FIG. 6 shows a method 100 for manufacturing the actuating device 10 in schematic representation of the method steps/stages. In this case, providing 101 of the cover element 11 and provision 102 of the electronics unit 12 are provided. When providing 101 the cover element 11, the cover element 11 can, for example, be manufactured in a plastic injection molding process and/or taken from a store. When providing 101 the electronics unit 12, the sensor unit 20 and/or further electrical components can be arranged on the circuit board 13 of the electronics unit 12, in particular by a printing and/or etching process. Subsequently, the electronics unit 12 is arranged 103 on the cover element 11 so that the electronics outer side 12.2 of the electronics unit 12 is oriented towards the cover inner side 11.1 of the cover element 11. In particular, the electronics unit 12 can thereby be form-fittingly and/or force-fittingly fastened in a frame 14, with which the electronics unit 12 is arranged on the cover element 11, in particular on the electronics receptacle 15. Furthermore, the method 100 comprises fastening 104 the first sleeve section 31 to the cover element 11 so that the cover element 11 and the first sleeve section 31 form the closed sleeve 30. For example, the electronics unit 12 may be thereby encapsulated with the cover element 11 when the first sleeve section 31 is formed by the casting compound 31.1 as shown in FIG. 3. Additionally or alternatively, the sealing means/element 33 can be applied when fastening 104 the first sleeve section 31, as shown in FIG. 4.

FIGS. 7 and 8 show an electronics unit 12 for the actuating device 10 in a possible embodiment. In this case, a circuit board 13 of the electronics unit 12 is arranged in a frame 14, by means of which fastening to a cover element 11 can be simplified. For this purpose, the frame 14 has latching elements 14.1 into which the circuit board 13 can be clipped. Furthermore, the frame 14 preferably has one or more receiving means/element 14.2 for a casting nozzle for casting compound 31.1, whereby the casting compound 31.1 can be advantageously distributed from an electronics inner side 12.1 over an electronics outer side 12.2. FIG. 7 shows the electronics unit 12 from the inner side of the electronics 12.1 and FIG. 8 shows the electronics unit 12 from the outer side of the electronics 12.2 opposite the inner side of the electronics 12.1. On the electronics outer side 12.2, sensor elements 21 of a sensor unit 20 are arranged in a regular pattern in a matrix-like manner on the circuit board 13. Each of the sensor elements 21 forms a capacitive surface. The sensor unit 20 is thus in particular a capacitive sensor, whereby a contactless actuation action 200 can be detected by the sensor unit 20. Furthermore, due to the matrix-like arrangement of the sensor elements 21, a direction of the actuation action 200 can be identified. For example, when a user brushes past a cover outer side 11.2 of the cover element 11, an electric field in the sensor elements 21 changes sequentially depending on the direction of the actuation action 200. Based on the sequence of detection by the sensor elements 21, the direction of the actuation action 200 can be inferred. For this purpose, the electronics unit 12 preferably has a control unit 25 for evaluating sensor signals from the sensor unit 20. Furthermore, an information unit 40 may be controllable by the control unit 25 in order to indicate to the user, for example, the detection of the actuation action 200 and/or the direction of the actuation action 200. In each case corresponding to the sensor elements 21, shielding elements 21.1 for shielding the sensor elements 21 are arranged in a matrix-like manner on the electronics inner side 12.1. In particular, an opposite shielding element 21.1 is associated with each of the sensor elements 21.

FIGS. 9 and 10 show an electronics unit 12 for the actuating device 10 in a further possible embodiment. Here, the electronics unit 12 corresponds essentially to the electronics unit 12 of the embodiment example of FIGS. 7 and 8, but the sensor elements 21 of the sensor unit 20 are designed/configured and arranged in a strip-like manner. While in the case of a matrix-like arrangement it may also be possible to detect several directions of an actuation action 200, the direction of the actuation action 200 can be detected along a straight line in the case of the strip-like sensor elements 21. However, the strip-like arrangement of the sensor elements 21 results in a larger capacitive field for the same installation space in each case, which can reduce false detection. On an electronics inner side 12.1, shielding elements 21.1 are arranged in a strip-like manner corresponding to the strip-like design/configuration of the sensor elements 21.

In addition to the sensor unit 20, the electronics unit 12 preferably comprises a touch sensor 22, an identification means/device 23 and/or a proximity sensor 24, as shown in FIGS. 11 to 13. The identification means/device 23 may in particular comprise a radio element 23.1, in particular in the form of an electric coil, which may be printed as a circumferential conductor track on the circuit board 13. The identification means/device 23 may enable contactless data exchange with an ID transponder of the user. Thus, the identification means/device 23 may preferably comprise an NFC interface, a BLE interface and/or a UWB interface. This enables identification and/or authentication of the user, in particular by vehicle electronics with which the identification means/device 23 can be brought into data communication connection. Depending on the identification of the user by the identification means/device 23, automatic locking and/or unlocking of the vehicle 1 may be provided. The touch sensor 22 may comprise, for example, an LDC sensor by means of which a deformation due to a touch or pressure on the cover element 11 can be detected. Depending on the actuation of the touch sensor 22, a further function of the vehicle 1, such as an automatic opening movement and/or an automatic closing movement of the vehicle part 2 or an emergency stop can be triggered when moving the vehicle part 2. By means of the in particular additional proximity sensor 24, it may be possible, for example, to send an alarm signal to further electronic components as a function of a detection of the approach of the user. Preferably, the touch sensor 22, the identification means/device 23 and/or the proximity sensor 24 are arranged in different conductor layers 13.1, 13.2 on the circuit board 13. Thereby, for example according to FIG. 11, the sensor unit 20 and the identification means/device 23 can be arranged together on a first conductor layer 13.1. The touch sensor 22 and the proximity sensor 24 can furthermore each be arranged on a second conductor layer 13.2 of the circuit board 13. By means of a multilayer design/configuration of the circuit board 13, a compact design/configuration can be achieved, by means of which the circuit board 13 can be arranged advantageously in a small installation space on the cover element 11. By means of the touch sensor 22, the identification means/device 23 and/or the proximity sensor 24, the actuating device 10 can thus provide a convenient operating option for the user with a high degree of automation.

The foregoing explanation of the embodiments describes the present invention exclusively in the context of examples. Of course, individual features of the embodiments may be freely combined with one another, provided that this is technically expedient, without departing from the scope of the present invention.

LIST OF REFERENCE SIGNS

1 Vehicle
1.1 Body surface
2 Vehicle part
2.1 B-pillar
3 Opening element/means
10 Actuating device
10.1 Intermediate level
11 Cover element
11.1 Cover inner side
11.2 Cover outer side
12 Electronics unit
12.1 Electronics inner side
12.2 Electronics outer side
13 Circuit board
13.1 First conductor layer
13.2 Second conductor layer
14 Frame
14.1 Latching element
14.2 Receiving means/element

15 Electronics receptacle
20 Sensor unit
21 Sensor element
21.1 Shielding element
22 Touch sensor
23 Identification means/device
23.1 Radio element
24 Proximity sensor
25 Control unit
30 Sleeve
31 First sleeve section
31.1 Casting compound
31.2 Lid element
33 Sealing means/element
35 Connection
40 Information unit
41 Window area
41.1 Window material
42 Light emitter
43 Separation section
43.1 Intermediate element
100 Method
101 Provide
103 Arrange
104 Fastening
200 Actuation action

The invention claimed is:

1. An actuating device for triggering a function of a vehicle by a user, comprising a planar cover element configured to cover a B-pillar of the vehicle, the cover element having a cover inner side and a cover outer side, an electronics unit having a sensor unit for detecting an actuation action of the user for triggering the function of the vehicle, an electronics outer side and an electronics inner side which is opposite the electronics outer side, and a first sleeve section for protecting the electronics inner side, the first sleeve section comprising a casting compound, wherein the electronics unit is oriented with the electronics outer side towards the cover inner side and is arranged on the cover element in order to detect the actuation action on the cover outer side, wherein the casting compound is arrested to the cover element by a material bond, so that the cover element and the casting compound form a closed sleeve for protecting the electronics unit.

2. The actuating device according to claim 1, wherein the cover element has an electronics receptacle for receiving the electronics unit.

3. The actuating device according to claim 1, wherein the electronics unit has a circuit board with at least one sensor element of the sensor unit for detecting the actuation action.

4. The actuating device according to claim 3, wherein the circuit board has a plurality of conductor layers, the sensor unit being arranged on a first conductor layer and at least the touch sensor or the identification device being arranged on a further conductor layer.

5. The actuating device according to claim 3, wherein the sensor unit has a plurality of sensor elements for detecting the actuation action, whereby a direction of the actuation action can be identified.

6. The actuating device according to claim 5, wherein the sensor elements are arranged in a regular pattern on the circuit board.

7. The actuating device according to claim 1, wherein the electronics unit has an information unit by means of which at least the detection of the actuation action can be confirmed to the user on the outer side of the cover or a start of the actuation action can be signaled.

8. The actuating device according to claim 7, wherein the information unit is an optical information unit and the cover element has at least one light transmitting window area through which an optical signal can be transmitted to the user by the information unit.

9. The actuating device according to claim 8, wherein the information unit has a plurality of light emitters for emitting an optical signal to the user.

10. The actuating device according to claim 1, wherein the electronics unit is enclosed in a frame with which the electronics unit can be positioned on the cover element.

11. The actuating device according to claim 1, wherein the electronics outer side of the electronics unit is covered with the casting compound, so that the casting compound can be conveyed from the electronics inner side to the electronics outer side while the electronics unit is arranged on the cover element.

12. The actuating device according to claim 1, wherein the electronics unit has a touch sensor for detecting a pressure on the cover element, as a result of which a further function of the vehicle can be triggered.

13. The actuating device according to claim 1, wherein the electronics unit has an identification device for identifying the user.

14. The actuating device according to claim 1, wherein the electronics unit comprises a proximity sensor for detecting an approach of a user.

15. The actuating device according to claim 1, wherein the electronics unit has a control unit for evaluating sensor signals from the sensor unit and for actuating the information unit as a function of the sensor signals.

16. The actuating device according to claim 1, wherein the closed sleeve is created by applying the casting compound in at least partially liquid form to the electronics unit and the cover element, the casting compound forming a surface of the sleeve facing an interior of the vehicle.

17. A vehicle comprising an actuating device for triggering a function of the vehicle by a user, comprising a planar cover element configured to cover a B-pillar of the vehicle, the cover element having a cover inner side and a cover outer side, an electronics unit having a sensor unit for detecting an actuation action of the user for triggering the function of the vehicle, an electronics outer side and an electronics inner side facing the electronics outer side, and a first sleeve section for protecting the electronics inner side, the first sleeve section comprising a casting compound, wherein the electronics unit is oriented with the electronics outer side towards the cover inner side and is arranged on the cover element in order to detect the actuation action on the cover outer side, wherein the casting compound is arrested to the cover element by a material bond, so that the cover element and the casting compound form a closed sleeve for protecting the electronics unit.

18. The vehicle according to claim 17, wherein the vehicle part is a door of the vehicle, an opening element being provided for automatically opening the door as a function of the actuation action.

19. A method for manufacturing an actuating device the method comprising:

providing a planar cover element configured to cover a B-pillar of a vehicle, the covering element having a cover inner side and a cover outer side, providing an electronics unit with a sensor unit for detecting an actuation action of the user for triggering the function of the vehicle, arranging the electronics unit on the cover element so that an electronics outer side of the electronics unit is oriented towards the cover inner side of the cover element, and attaching a first sleeve section for protecting the electronics inner side to the cover element, so that the cover element and the first sleeve section form a closed sleeve for protecting the electronics unit, wherein the first sleeve section comprises a casting compound, and wherein the casting compound is arrested to the cover element by a material bond, so that the cover element and the casting compound form a closed sleeve for protecting the electronics unit.

* * * * *